Sept. 11, 1962      E. C. SCHUNKE      3,053,922
MULTIPLE THERMOCOUPLE
Filed June 6, 1957
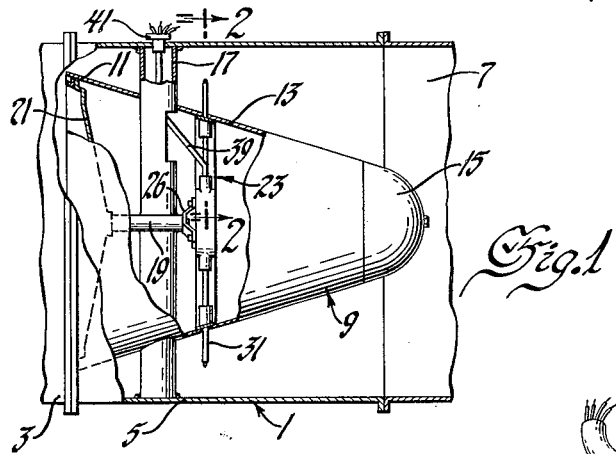
Fig. 1
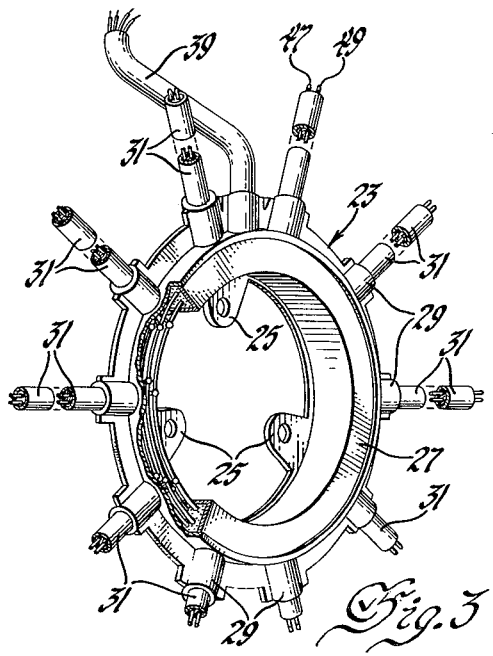
Fig. 3
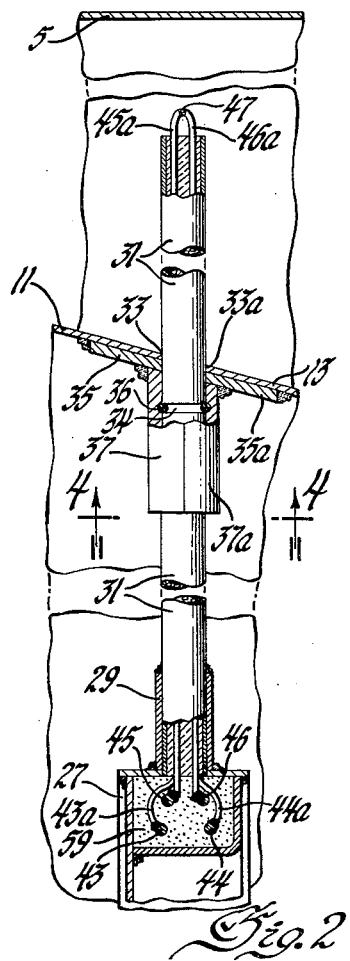
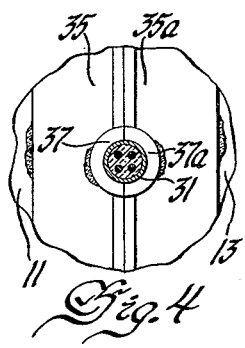
Fig. 4
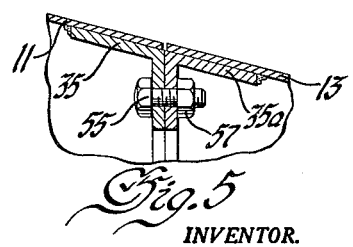
Fig. 5
Fig. 2
INVENTOR.
Edwin C. Schunke
BY
Paul Fitzpatrick
ATTORNEY United States Patent Office 3,053,922
Patented Sept. 11, 1962

3,053,922
MULTIPLE THERMOCOUPLE
Edwin C. Schunke, Speedway, Ind., assignor to General Motors Corporation, Detroit, Mich., a corporation of Delaware
Filed June 6, 1957, Ser. No. 664,020
3 Claims. (Cl. 136—4)

This invention relates to temperature sensing means of a type especially suitable for use in gas turbine engines and more particularly to such means for measuring the average temperature of an exhaust gas stream in engines of this character.

It is general practice to mount thermocouples in the exhaust duct of gas turbine engines to provide a warning if gas issuing from the turbine reaches an excessive temperature and, in some cases, to operate automatic controls. Individual thermocouples inserted through the outer wall of the exhaust duct at circumferentially spaced points have hereto generally been employed. These constructions require an external thermocouple harness requiring a considerable amount of material and apparatus that has considerable weight, is costly to make, and may interfere with nozzle actuating equipment external to the exhaust duct.

Furthermore, the use of a thermocouple harness on the outside of the exhaust duct may be subject to considerable averaging errors due to the large diameter of the harness.

Accordingly, it is an object of this invention to provide an internal thermocouple and thermocouple harness contained almost entirely within the exhaust nozzle tail cone and which eliminates the disadvantages of the external type harness. These and other objects of the invention will be readily apparent to one skilled in the art from the following specification.

In general, the thermocouple harness consists of a ring-like thermocouple supporting structure mounted within the exhaust tail cone and having a plurality of circumferentially spaced thermocouple probes radially extending through apertures formed between two adjoining tail cone sections, the thermocouple probes extending into the exhaust duct. A single lead-in conduit carries lead wires through the outside nozzle wall to circular bus bars contained within the thermocouple supporting member. Each of the radially extending thermocouples is connected to the circular bus bars.

FIGURE 1 is a longitudinal section of an exhaust duct of an aircraft gas turbine engine including temperature measuring means in accordance with the preferred embodiment of the present invention;

FIGURE 2 is an enlarged sectional view of one of the thermocouple probes shown in FIGURE 1;

FIGURE 3 is a perspective view of the thermocouple support and probes with portions being broken away;

FIGURE 4 is a sectional view of one of the probes taken on the line 4—4 of FIGURE 2; and FIGURE 5 is a sectional view showing the joint between two adjacent tail cone sections.

Referring to FIGURE 1, the engine exhaust duct has an outer wall, generally indicated by 1, consisting of three cylindrical sections 3, 5 and 7 and an inner tail cone structure generally indicated at 9 including truncated cone sections 11 and 13 and a hemispherical portion 15. The tail cone 9 is supported within the outer wall 1 by a plurality of struts 17 fastened to the outer wall 1 and to a centrally located support tube 19. The support tube 19 carries on its forward end a cone shaped plate 21 fastened to the tail cone section 11. The rear end of support tube 19 carries a thermocouple support harness generally indicated by 23. Brackets 25 formed on the support 23 are bolted to brackets 26 carried by the tube 19.

In general, the thermocouple support member 23 consists of a ring shaped hollow portion 27 having a generally rectangular cross section. Circumferentially spaced around ring 27 are cylindrical bushings 29 through which extend hollow thermocouple probes 31 fixed to member 27. Along the joining edge between tail cone sections 11 and 13 are semi-circular notches 33 and 33a that form circular apertures therebetween through which probes 31 extend.

Welded or otherwise secured to cone sections 11 and 13 are circular angle members 35 and 35a respectively. These members have semi-circular notches corresponding to those in sections 11 and 13. Welded or otherwise secured to members 35 and 35a are semi-cylindrical members 37 and 37a respectively which together form bushings for probes 31.

The probes 31 have a circular groove 34 that cooperates with semi-circular grooves 36 in bushing members 37 and 37a to hold a sealing compound to prevent gases from leaking into the cone section.

A conduit 39 connects to the ring 27 through one of the bushings 29 and extends into and through one of the struts 17 and through the outer wall 1. A connector 41 is provided for connecting lead wires from the ring 27 to measuring devices or controls external to the engine.

Within the ring 27 are two pairs of bus bars 43—44 and 45—46, each pair forming an individual thermocouple network. In each of the probes 31 are likewise two pairs of leads 43a—44a and 45a—46a. Leads 43a and 44a are connected to bus bars 43 and 44 and are connected together at the end of the probe to form a thermocouple junction 47. Similarly, leads 45a and 46a are connected to bus bars 45 and 46 and are connected together at the probe end to form a junction 49. It is understood that bus bars 43 and 45 and leads 43a and 45a are made of different materials than are bus bars 44 and 46 and leads 44a and 46a. Chromel and Alumel may be used, for example.

The bus bars 43, 44, 45 and 46 are supported and insulated from each other by a suitable packing 59 such as MgO which fills the ring 27. Likewise, the probes 31 and conduit 39 may have a similar packing.

As seen in FIGURE 5, the two tail cone sections 11 and 13 as well as bushing members 37 and 37a are held together by flange members 35 and 35a welded or otherwise secured to sections 11 and 13. Bolts 55 and nuts 57 act to hold the flanges tightly together and allow for easy disassembly and removal of the thermocouple harness.

It will be apparent to those skilled in the art that other arrangements and applications may be made within the scope of the invention which is not to be limited by the specific embodiment shown and described.

What is claimed is:

1. In combination, an exhaust duct comprising an outer wall and an inner wall, said inner wall having two portions joined together transversely of the duct axis, each portion having a plurality of circumferentially spaced semi-circular notches along its joining edge to form a plurality of circumferentially spaced apertures therebetween, a thermocouple harness mounted within said inner wall having a plurality of thermocouples extending radially therefrom through said apertures into the exhaust duct formed by said inner and outer walls, said harness including a circular hollow conduit arranged transversely of said duct axis and a plurality of bus bars in said circular conduit, said thermocouples being connected to said bus bars.

2. In combination, a tubular exhaust duct formed between an outer wall and an inner wall, said inner wall having two portions joined together transversely of the duct axis, each portion having a plurality of circumferentially spaced notches formed along its joining edge, the notches of each portion forming therebetween a plurality of circumferentially spaced inner wall apertures, said outer wall having an aperture formed therein, a thermocouple carrying member mounted within said inner wall, said member comprising a substantially circular hollow conduit having signal collecting leads therein, a second conduit radially extending from said member through one of said inner wall apertures and through said outer wall aperture, a plurality of thermocouples radially extending from said member through the remaining inner wall apertures into the exhaust duct, and thermocouple leads extending through said second conduit into said member and connected to said signal collecting leads, said thermocouples each connected to said signal collecting leads.

3. In combination, a tubular gas duct formed between concentric inner and outer walls, a hollow ring-like support member mounted within said inner wall, a plurality of circumferentially spaced thermocouple probes extending radially outward from said support member and through said inner wall toward said outer wall, a lead conduit extending radially outward from said member through said inner wall and through said outer wall, a pair of insulated circular bus bars in said support member, a thermocouple lead wire extending through said conduit into said member and connected to each of said bus bars, and a plurality of thermocouples connected to said bus bars and extending into said probes.

References Cited in the file of this patent

UNITED STATES PATENTS

| | | |
|---|---|---|
| 1,985,967 | Wunsch | Jan. 1, 1935 |
| 2,394,749 | Chester | Feb. 12, 1946 |
| 2,472,759 | Raspet | June 7, 1949 |
| 2,698,872 | Broffitt | Jan. 4, 1955 |
| 2,792,685 | Constantino et al. | May 21, 1957 |
| 2,875,613 | Neal | Mar. 3, 1959 |
| 2,926,209 | Cantlin et al. | Feb. 23, 1960 |

FOREIGN PATENTS

| | | |
|---|---|---|
| 640,971 | Great Britain | Aug. 2, 1950 |